Sept. 15, 1959 J. R. FITZGERALD 2,904,175
FRUIT SIZING MACHINE
Filed March 14, 1956
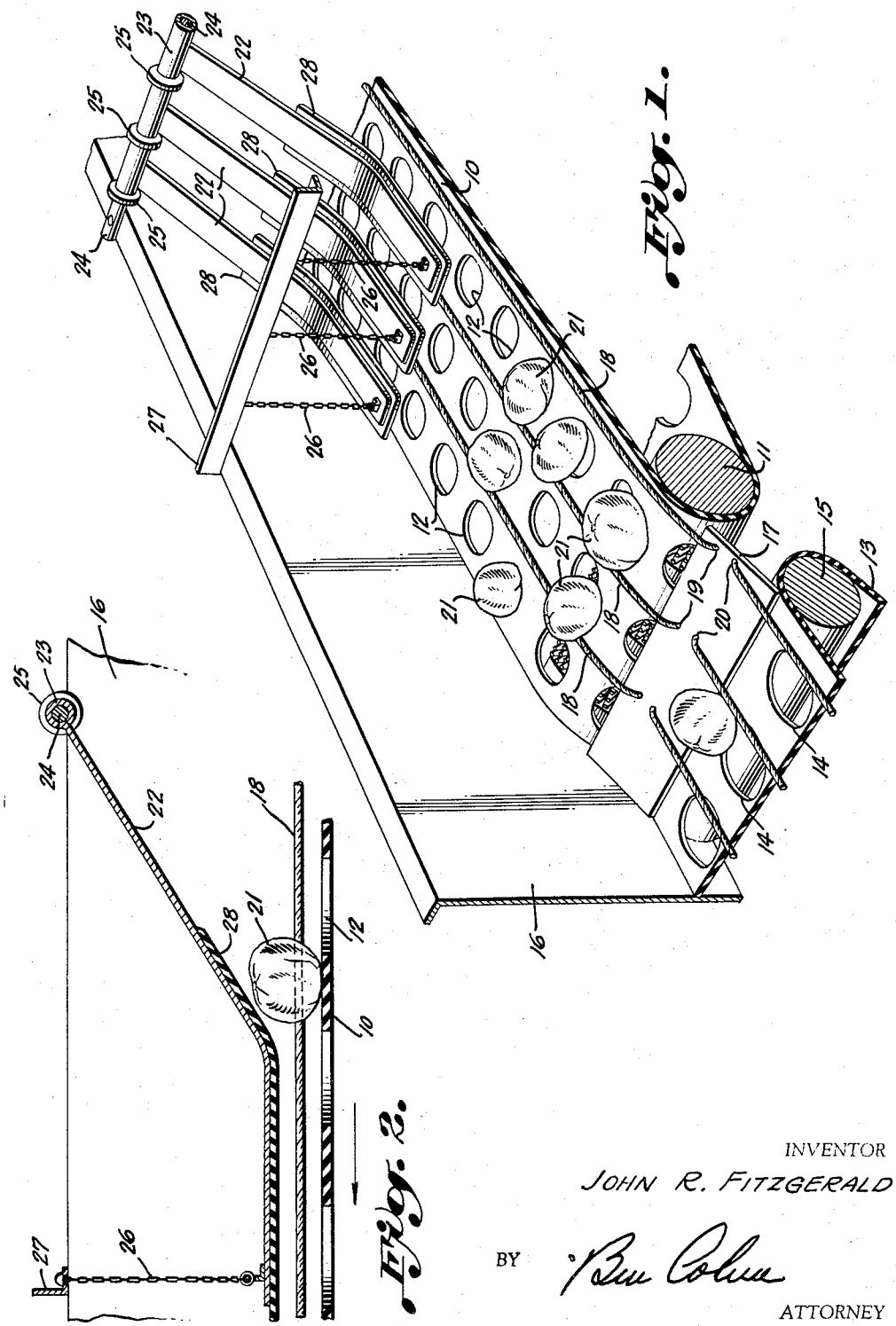
INVENTOR
JOHN R. FITZGERALD
BY
ATTORNEY

2,904,175
FRUIT SIZING MACHINE

John R. Fitzgerald, Harlingen, Tex.

Application March 14, 1956, Serial No. 571,432

3 Claims. (Cl. 209—84)

The present invention relates to a machine for sizing and grading fruits and vegetables and relates more particularly to a machine for sizing tomatoes.

On conventional tomato sizing machines employing a series of endless rubber belts, each belt having a plurality of holes of similar size with the holes in the succeeding belts increasing in size, it has been the practice to run the belts at a steep incline and in some cases to shake the belts, so that tomatoes will not ride up the belt on an uncut portion of the belt. This continual shaking and rolling from one hole to the other causes damage to the tomatoes, especially to the pink or ripe ones.

The present invention has for its primary object to provide a sizing machine which will minimize the amount of friction between the tomatoes and the conveying belts and thereby minimize the amount of damage to the skin of the tomato.

The present invention provides a machine wherein the belts are at a very slight incline with the sizing openings cut in lanes longitudinally and laterally of the belt. Means in the form of stationary cotton ropes are stretched from one end of the machine to the other. These ropes are positioned between adjacent rows of openings and serve to confine the tomatoes in a single lane and prevent same from riding across the belt.

A further feature of the invention is to provide means to prevent the tomatoes from riding up the belt between the longitudinal holes and to insure quick entrance of the tomato in a belt opening. In the past, vertical flaps, rubber fingers and the like have been used to cause the tomatoes to roll into a hole but if these devices were heavy enough to serve the purpose, they usually caused damage to the tomatoes. The device used in the present invention is flexibly supported in such manner as to gently roll the tomato into each of the moving holes.

A further feature of the present invention resides in the relative simplicity of the present structure and which can be readily applied to existing sizing machines.

Further objects and advantages of the present invention will be readily apparent from the following detailed description of the invention taken in conjunction with the accompanying drawing showing a preferred embodiment of the invention and wherein:

Figure 1 is a perspective view of a portion of the sizing machine showing the features of the present invention.

Figure 2 is an enlarged vertical sectional view showing in detail the features of the present invention.

Referring to the drawing in detail, it will be seen that only a small section of the sizing apparatus has been illustrated. The sizing apparatus usually comprises a plurality of endless belts with a plurality of similar sized openings in each belt to permit the passage of fruit through the openings, with the openings in one belt being of the same size and smaller than the openings in the next belt. As the various sized objects pass through the proper opening, means are provided to remove the sized objects.

The belt indicated by numeral 10, usually formed of rubber or equivalent flexible material about one fourth inch thick, encompasses an idler pulley (not shown) and a drive pulley 11. A plurality of openings 12 in rows approximately four inches apart are provided in said belt. The second conveyor belt 13, is also provided with a plurality of openings 14 in line with the openings 12 in the first belt but of slightly larger size for reasons previously explained. Numeral 15 indicates the idler pulley for belt 13 and a drive pulley positioned at the forward end of this belt is not shown.

The sizing table, which may be of any conventional construction, includes opposed side walls for confining the objects being sized and which serve as supports for the various rollers supporting the conveyor belts. One of said walls is indicated by numeral 16 and it will be understood that a similar wall is positioned on the opposite side of the machine.

Transfer means are provided between adjacent belts to transfer the objects being sized from one belt to another. As seen in Figure 1, the transfer means comprises a thin flat plate 17 extending across the width of the table between the side walls 16 and being slightly longer than the distance between adjacent belts. The plate is welded or otherwise secured to the opposed side walls 16 and supports a series of longitudinally spaced ropes 18 passing through alined openings 19, 20 in the plate 17. The ropes 18 are positioned between the rows of openings 12 and 14 and extend the entire length of the machine. It will be noted that the openings 19 and 20 are offset with respect to the center line of the plate 17 which causes the ropes to be slightly spaced from the surface of the moving belts. Thus, the ropes serve to confine the sized objects, indicated by numeral 21, to a substantially straight path and prevent them from passing up the belt on an uncut section laterally between the holes.

In order to prevent the tomatoes from riding up the belt between the holes, and on the section of the uncut belt between the longitudinal holes, there is provided a series of flexibly supported members designed to roll the tomatoes into the holes. These members 22 consist of long flexible strips having a slight bend between the ends of each strip. One end of each of the strips is in the form of a loop 23 to encompass the shaft 24 supported on the top edges of the side walls 16, said strips being freely swingable on said shaft. Spacing members 25 insure proper positioning of these strips whereby they overlie the longitudinal row of holes 12. The opposite ends of the strip are supported in spaced relationship to the conveyor belts by a series of chains 26 or the like from a supporting member 27 bridging the side walls 16. Suitably secured to the lower side of the strips are rubber or the like cushioning elements 28.

While there is shown a single series of flexible strips, a similar series of strips can be positioned at the juncture between successive belts. It will be apparent that the chains limit the downward movement of the strips but said strips will move upwardly as the tomatoes move under these strips. Thus, the strips contacting the upper surface of the tomato will roll same into the next opening as the belt moves along.

From the foregoing description, it is readily apparent that the present construction is well adapted to accomplish the objects and advantages of the invention. It will be understood that minor changes may be made in the details of construction without departing from the spirit of the invention except as may be required by the scope of the following claims.

Having thus described the invention, what is claimed is:

1. In an article sizing machine having a moving belt, a plurality of openings in said belt for receiving the articles being sized, a series of strips swingably mounted on the machine, means connected to the machine and to each free end of the strips to space said free ends from the surface of the belt a distance smaller than the articles being sized but permitting upward swinging movement of said strips.

2. An article sizing machine as defined in claim 1, and spaced stationary ropes mounted across the machine to define longitudinal lanes.

3. In an article sizing machine having a moving belt, a plurality of openings in said belt for receiving the articles being sized, means overlying said belt and spaced therefrom a distance less than the articles being sized, flexible means supporting said first means limiting downward movement of said first means but permitting upward movement of said first means, and spaced stationary ropes mounted across the machine to define longitudinal lanes.

References Cited in the file of this patent

UNITED STATES PATENTS

| Number | Name | Date |
|---|---|---|
| 677,259 | O'Neall | June 25, 1901 |
| 680,466 | Sherk | Aug. 13, 1901 |
| 1,097,439 | Jaquette | May 19, 1914 |
| 1,289,577 | Tallefson | Dec. 31, 1918 |
| 1,313,418 | Reed | Aug. 19, 1919 |
| 1,868,356 | Helenbolt | July 19, 1932 |
| 1,981,081 | Simpson | Nov. 20, 1934 |
| 2,039,688 | Fitzgerald | May 5, 1936 |